(12) United States Patent
Mathew et al.

(10) Patent No.: US 12,187,892 B2
(45) Date of Patent: Jan. 7, 2025

(54) POLYAMIDE COMPOSITIONS

(71) Applicant: Celanese Polymers Holding, Inc., Wilmington, DE (US)

(72) Inventors: Annakutty Mathew, Kingston (CA); Masahiro Nozaki, Utsunomiya (JP); Toshikazu Kobayashi, Chadds Ford, PA (US); Mark Wichmann, Wilmington, DE (US)

(73) Assignee: Celanese Polymers Holding, Inc., Wilmington, DE (US)

( * ) Notice: Subject to any disclaimer, the term of this patent is extended or adjusted under 35 U.S.C. 154(b) by 390 days.

(21) Appl. No.: 17/594,210

(22) PCT Filed: Apr. 10, 2020

(86) PCT No.: PCT/US2020/027709
§ 371 (c)(1),
(2) Date: Oct. 6, 2021

(87) PCT Pub. No.: WO2020/210656
PCT Pub. Date: Oct. 15, 2020

(65) Prior Publication Data
US 2022/0169850 A1     Jun. 2, 2022

Related U.S. Application Data (60) Provisional application No. 62/831,781, filed on Apr. 10, 2019.

(51) Int. Cl.
*C08L 77/06* (2006.01)
*C08G 69/36* (2006.01)
*C08K 3/34* (2006.01)
*C08K 5/01* (2006.01)

(52) U.S. Cl.
CPC .............. *C08L 77/06* (2013.01); *C08G 69/36* (2013.01); *C08K 3/346* (2013.01); *C08K 5/01* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 9,845,389 B2 | 12/2017 | Harder et al. | |
| 9,963,591 B2 | 5/2018 | Bayer et al. | |
| 11,041,047 B2 | 6/2021 | Lamberts et al. | |
| 2006/0023769 A1* | 2/2006 | Mathew | G05D 23/022 374/208 |

(Continued)

FOREIGN PATENT DOCUMENTS

| | | | |
|---|---|---|---|
| EP | 0592996 A2 * | 4/1994 | |
| JP | H 06207100 A | 7/1994 | |

(Continued)

*Primary Examiner* — Yan Lan
(74) *Attorney, Agent, or Firm* — Dority & Manning, P.A.

(57) ABSTRACT

Provided herein are polyamide compositions having a combination of specific physical properties that enable the molding of articles comprising at least one annular connector or barb of specific dimensions for attachment of hoses to the article. Further provided are processes to prepare these compositions and articles prepared from the compositions.

21 Claims, 2 Drawing Sheets

(56) References Cited

U.S. PATENT DOCUMENTS

| | | | | |
|---|---|---|---|---|
| 2010/0160008 A1* | 6/2010 | Topoulos | ................ | C08L 77/06 |
| | | | | 455/575.1 |
| 2012/0256414 A1* | 10/2012 | Ully | ..................... | F16L 37/133 |
| | | | | 137/15.01 |
| 2015/0274968 A1* | 10/2015 | Bayer | ...................... | C08K 7/14 |
| | | | | 264/523 |
| 2019/0136053 A1* | 5/2019 | Takamasa | .............. | C08K 3/013 |

FOREIGN PATENT DOCUMENTS

| | | | | |
|---|---|---|---|---|
| WO | WO-2015057557 A1 * | 4/2015 | ............. | C08G 69/04 |
| WO | WO 2019/067517 A1 | 4/2019 | | |
| WO | WO-2019195694 A1 * | 10/2019 | ............. | B33Y 70/00 |

\* cited by examiner

POLYAMIDE COMPOSITIONS

CROSS-REFERENCES TO RELATED APPLICATIONS

This application claims priority under 35 U.S.C. §§ 365 and 371 to International Application No. PCT/US2020/022709, filed on Apr. 10, 2020, which in turn claims priority to U.S. Provisional Appln. No. 62/831,781, filed on Apr. 10, 2019, each of which is incorporated herein by reference in its entirety.

FIELD OF THE INVENTION

Described herein are polyamide compositions having a combination of specific physical properties that enable the molding of articles comprising at least one annular connector or barb of specific dimensions for attachment of hoses to the article. Also described herein are processes to prepare these polyamide compositions and articles prepared from the compositions.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Polyamide resins possess excellent mechanical properties, moldability, and chemical resistance and have therefore been used in automotive parts, electric/electronic components, mechanical components, and many other applications. Articles made from polyamide resins can possess extremely desirable physical properties. However, for the molding of articles comprising at least one annular connector or barbed hose connector, it is desirable that the polyamide compositions permit molding of such articles having specific barb dimensions relative to the shaft of the barbed hose connector and wherein the molded article with undercut barb can be easily self-stripped for removal from the mold.

WO 2019/067517 discloses a process for preparing PA 6T/6I/6 copolyamides using polyamide oligomers.

U.S. Pat. No. 9,963,591 B2 discloses various copolyamides which comprise at least one filling and strengthening agent and at least one heat stabilizer.

It has now been discovered that polyamide compositions comprising specific polyamides provides a desirable combination of physical properties for use in applications including, but not limited to, articles comprising annular connectors for automotive applications, especially under the hood applications.

SUMMARY OF THE INVENTION

Accordingly, provided herein is polyamide composition comprising:
 (a) 45 to 65 weight percent of a semi-aromatic copolyamide comprising:
  (i) about 54 to about 62 mole percent hexamethylene terephthalamide repeat units;
  (ii) about 12 to about 29 mole percent hexamethylene isophthalamide repeat units; and
  (iii) about 9 to about 26 mole percent caprolactam repeat units;
 wherein the sum of (i), (ii), and (iii) total 100 mole percent;
 (b) 20 to 50 weight percent of a reinforcing agent;
 (c) 0.1 to 3.0 weight percent of at least one heat stabilizer;
 (d) 0 to 2.0 weight percent of at least one lubricant;
 (e) 0 to 2.0 weight percent of at least one nucleant;
 (f) 0 to 10 weight percent of at least one impact modifier;
 (g) 0 to 8 weight percent of at least one amorphous copolyamide; and
 (h) 0 to 25 weight percent of one or more additional additives;
wherein said polyamide composition exhibits a Tg of at least 100° C. when measured according to ASTM E1356-08 (2014), and when molded into test samples, exhibits a strain recovery of at least 85 percent measured at 150° C., a mold shrinkage of 0.8 percent or less when measured as an average of the flow and transverse direction according to ISO 294-4, and wherein the weight percent of (a), (b), (c), (d), (e), (f), (g), and (h) totals 100 weight percent.

DETAILED DESCRIPTION OF THE INVENTION

Abbreviations

The claims and description herein are to be interpreted using the abbreviations and definitions set forth below.
 "MPa" refers to megapascal.
 "%" refers to the term percent.
 "wt. %" refers to weight percent.
 "mm" refers to millimeters.
 "IV" refers to inherent viscosity.
 "Pa-s" refers to pascal-second.
 "1/s" refers to reciprocal second.

Definitions

As used herein, the article "a" refers to one as well as more than one and does not necessarily limit its referent noun to the grammatical category of singular number.

When a composition, a process, a structure, or a portion of a composition, a process, or a structure, is described herein using an open-ended term such as "comprising," unless otherwise stated in limited circumstances, the description also includes an embodiment that "consists essentially of" or "consists of" the elements of the composition, the process, the structure, or the portion of the composition, the process, or the structure.

As used herein, the term "article" refers to an item, thing, structure, object, element, device, etc. that is in a form, shape, configuration that is suitable for a particular use or purpose without further processing of the entire entity or a portion of it.

As used herein, the term "repeat unit" refers to part of a polymer whose repetition would produce the complete polymer chain. For example, for polyamide 6T the repeat unit is a terephthalic acid monomer bonded to a hexamethylenediamine monomer such that the repeat unit is terephthalic acid-hexamethylenediamine bonded together by an amide linkage. The resulting polymer is hexamethylene terephthalamide. For caprolactam the repeat unit is the monomer or single molecule.

As used herein, the terms "polyamide resin", "polyamide", and "polymer resin" refer to the neat polymer used in the polymer compositions and only comprises the polymer chain produced from the respective monomers. In other words, no additional additives are present in the polymer except that minor amounts of nucleating agents or residual materials used in the manufacturing process or may be present.

As used herein, the term "polyamide composition" refers to a polyamide resin and any additional materials used in the composition such as, for example, UV stabilizers, lubricants, flame retardants, reinforcing agents, and fillers.

As used herein, the terms "barb", "bulb", "annular connector", "barb(ed) connector", "annular snap joint", and "jump port" refer to the part of a molded article which comprises at least one self-stripping undercut at the end of a shaft or tube which is part of the molded article. An undercut is a design element of a part or mold in which a feature of the part is retained in the mold because it requires either deformation of the part or the movement or removal of an offending mold feature to allow the part to be removed. A self-stripping undercut is an undercut which by the nature of the part's geometry and the material's properties deforms during its removal from the mold cavity so that the part is removed from the mold without the benefit of movement or removal of the offending tool steel. A common annular undercut requires complex part deformation for removal from the mold. Examples of molded articles comprising an undercut include annular connectors such as those commonly found in water pumps, engine thermostats, and water inlets.

As used herein, the term "external lubricant" refers to lubricants which are present on the external surface of pellets or strands of the polyamide compositions. Such lubricants are not melt-mixed or added along with additional ingredients which are used to prepare the polyamide compositions. External lubricants are added after all other ingredients in the polyamide composition have been mixed together and formed into pellets or strands.

As used herein, the term "internal lubricant" refers to lubricants which are melt-mixed or added by other means along with additional ingredients which are used to prepare the polyamide compositions. Internal lubricants are uniformly dispersed within the polyamide composition.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description. Moreover, the disclosure of these ranges refers to a continuous set of values including the minimum and maximum values of the range and each and every real value between the minimum and maximum values.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

Generally

Described herein are novel polyamide compositions comprising copolyamide 6T/6I/6 resin having a specific molar ratio of repeat units, in combination with at least one reinforcing agent, heat stabilizer, lubricant, and optionally one or more additional additive(s). It has been discovered that when these 6T/6I/6 copolyamide resins are used to prepare polyamide compositions, the polyamide compositions allow for the molding of articles which comprise at least one annular connector, said annular connector on the article having specific dimensions which are difficult to obtain with the use of polyamide resins different than these 6T/6I/6 copolyamide resins in the polyamide compositions.

Specifically, described herein are novel polyamide compositions comprising:
(a) 45 to 65 weight percent of a semi-aromatic copolyamide comprising:
   (i) about 54 to about 62 mole percent hexamethylene terephthalamide repeat units;
   (ii) about 12 to about 29 mole percent hexamethylene isophthalamide repeat units; and
   (iii) about 9 to about 26 mole percent caprolactam repeat units;
   wherein the sum of (i), (ii), and (iii) totals 100 mole percent;
(b) 20 to 50 weight percent of a reinforcing agent;
(C) 0.1 to 3.0 weight percent of at least one heat stabilizer;
(d) 0 to 2.0 weight percent of at least one lubricant;
(e) 0 to 2.0 weight percent of at least one nucleant;
(f) 0 to 10 weight percent of at least one impact modifier;
(g) 0 to 8 weight percent of at least one amorphous copolyamide; and
(h) 0 to 25.0 weight percent of at least one additional additive;

wherein said polyamide composition exhibits a Tg of at least 100° C. when measured according to ASTM-E1356-08 (2014) and when molded into test samples, exhibits a strain recovery of at least 85 percent measured at 150° C., a mold shrinkage of 0.8 percent or less when measured as an average of the flow and transverse direction, and wherein the weight percentages of the individual components (a), (b), (c), (d), (e), (f), (g), and (h) of the polyamide composition are based on the total weight of the polyamide composition, and wherein the total of the weight percentages of the individual components (a), (b), (c), (d), (e), (f), (g), and (h) is 100 weight percent.

Also described herein are processes for making these polyamide compositions and articles molded from said polyamide compositions.

Semi-Aromatic Copolyamide (a)

Semi-aromatic copolyamide resins used in polyamide compositions described herein comprise (i) about 54 to about 62 mole percent hexamethylene terephthalamide repeat units; (ii) about 12 to about 29 mole percent hexamethylene isophthalamide repeat units; and (iii) about 9 to about 26 mole percent caprolactam repeat units. These semi-aromatic copolyamides may also be described as poly(hexamethylene terephthalamide/hexamethylene isophthalamide/caprolactam) copolyamides (PA6T/6I/6). Also preferably, the semi-aromatic copolyamide resins are semi-crystalline.

More preferably, semi-aromatic copolyamides used in the polyamide compositions described herein comprise (i) about 54 to about 62 mole percent hexamethylene terephthalamide repeat units; (ii) about 22 to about 29 mole percent hexamethylene isophthalamide repeat units; and (iii) about 9 to about 18 mole percent caprolactam repeat units.

It has surprisingly been discovered that copolyamides comprising these specific molar ratios of 6T, 6I, and 6 (caprolactam) exhibit a specific combination of properties that allows for the preparation of polyamide compositions which can be molded into articles comprising at least one annular or other connector which has dimensions such that the connector cannot be easily manufactured with other polyamide compositions.

These semi-aromatic copolyamides preferably have a minimum intrinsic viscosity (IV) of about 0.80 dl/gram. The method for determining IV is as set forth in the Examples, below. Although there is no specific maximum intrinsic viscosity for these semi-aromatic copolyamides, a practical maximum IV is about 1.30, preferably about 1.15. Typically, solid state polymerization (SSP) is used to obtain intrinsic viscosities above about 0.90 but semi-aromatic copolyamides having an IV up to about 1.15 can be prepared during the polymerization process. U.S. Pat. No. 5,955,569 discloses typical SSP processes.

Preferred PA 6T/6I/6 copolyamide resins exhibit one or more of: an elastic recovery (strain recovery) of at least 85 percent when measured at 150° C., a mold shrinkage of 1.5 percent or less, and a glass transition temperature (Tg) of at least 100° C. More preferred copolyamide resins exhibit two or three of these properties, or all three of these properties. Preferred and more preferred PA 6T/6I/6 copolyamide resins may also exhibit a surface gloss of at least 70 to 90 percent when molded at 150° C. and when an external lubricant is used.

Also preferably, the PA 6T/6I/6 copolyamide resins exhibit one or more of: a strain recovery of at least 85 percent, preferably at least 88 percent, and more preferably at least 90 percent when measured by DMA at 150° C.; a mold shrinkage of 1.5 percent or less, preferably 1.4 percent or less, 1.0% or less, or 0.7% or less, when measured according to ISO 294-4; a Tg of at least 100° C., preferably at least 110° C., and more preferably at least 120° C., as measured according to ASTM-E1356-08(2014); and an intrinsic viscosity of at least 0.80, preferably at least 0.90, as measured according to the method set forth in the Examples, below.

The preferred and more preferred PA 6T/6I/6 copolyamide resins are used to prepare polyamide compositions which may be molded into preferred articles, such as for example articles having at least one annular or barb connector.

Suitable semi-aromatic copolyamides may be synthesized by methods that are known in the art, for example those described in PCT Intl. Patent Appln. Publn. No. WO2015/057557 by Annakutty Mathew.

The weight percent of semi-aromatic copolyamide in the polyamide compositions may range from about 45 to 65 weight percent, preferably from 55 to 62 weight percent, based on the total weight of all ingredients (a) to (h) present in the polyamide composition.

Reinforcing Agent (b)

The polyamide compositions described herein include at least one reinforcing agent for improving mechanical strength and other properties. The reinforcing agent may be a fibrous, tabular, powdery or granular material. Examples of fibrous reinforcing agents include glass fibers, carbon fibers, gypsum fibers, ceramic fibers, asbestos fibers, zirconia fibers, alumina fibers, silica fibers, titanium oxide fibers, and silicon carbide fibers.

The reinforcing agent may also be in powdery, granular or tabular form such as mica, talc, kaolin clay, silica, calcium carbonate, potassium titanate, glass beads, glass flakes, glass microballoons, wollastonite, montmorillonite, titanium oxide, zinc oxide, and graphite. Two or more reinforcing agents may be combined in these polyamide compositions, and although not expressly stated herein, these compositions may include any combination of reinforcing agents described herein.

Preferred reinforcing agents include glass fibers, glass flakes, kaolin clay, wollastonite, mica, calcium carbonate, silica, carbon fibers, potassium titanate, and combinations of these.

The glass fiber, flake, or bead may be sized or unsized. Suitable glass fibers may be chopped strands of long or short glass fibers, and milled fibers of these. The reinforcing agent may be processed on its surface with any known coupling agent (e.g., silane coupling agent, titanate coupling agent) or with any other surface-treating agent.

If used, fibers may have a circular or non-circular cross section. A fiber having a non-circular cross section refers to a fiber having a major axis lying perpendicular to a longitudinal direction of the fiber and corresponding to the longest linear distance in the cross section. The non-circular cross section has a minor axis corresponding to the shortest linear distance in the cross section in a direction perpendicular to the major axis. The non-circular cross section of the fiber may have a variety of shapes including a cocoon-type (figure-eight) shape; a rectangular shape; an elliptical shape; a semielliptical shape; a roughly triangular shape; a polygonal shape; and an oblong shape. As will be understood by those skilled in the art, the cross section may have other shapes. The ratio of the length of the major axis of the non-circular cross-section to that of the minor axis of the non-circular cross-section is preferably between about 1.5:1 and about 6:1. The ratio is more preferably between about 2:1 and 5:1 and yet more preferably between about 3:1 to about 4:1. Suitable fibers having a non-circular cross section are disclosed in EP Pat. No. 196194. The non-circular fibers may be long fibers, chopped strands, milled short fibers, or other suitable forms known to those skilled in the art.

When circular or non-circular fibrous reinforcing agents are used they may have essentially any diameter but preferably their diameter (cross-sectional) or average diameter ranges from about 1 micron to 20 microns, more preferably from about 5 microns to 20 microns.

The total concentration of all reinforcing agents in the polyamide compositions may range from about 20 to about 50 weight percent, preferably about 25 to about 45 weight percent, and more preferably about 30 to about 40 weight percent based on the total weight of all ingredients (a) to (h) present in the polyamide composition.

Heat Stabilizer (c)

The polyamide compositions further comprise at least one heat stabilizer. Heat stabilizers include organic and inorganic heat stabilizers. When the heat stabilizer is an organic heat stabilizer, it is also called an 'antioxidant'. Examples of suitable antioxidants are sterically hindered phenolic compounds, amine antioxidants such as aromatic secondary amines, phosphorus-based antioxidants, and copper-based heat stabilizers. Examples of sterically hindered phenols include, N,N'-hexane-1,6-diylbis(3-(3,5-di-tert.-butyl-4-hydroxyphenylpropionamide)), pentaerythritol tetrakis(3-(3,5-di-tert-butyl-4-hydroxyphenyl)propionate); octadecyl-3-(3,5-di-tert.butyl-4-hydroxyphenyl)-propionate; 1,3,5-trimethyl-2,4,6-tris(3,5-di-tert-butyl-4-hydroxybenzyl) benzene; 2',3 bis [3,5-ditertiary butyl-4-hydroxyphenyl) propionyl]propionohydrazide; N, N' hexane-1,6-diylbis[3,5 ditertiary butyl-4-hydroxyphenyl propionamide, or the like. N,N'-hexane-1,6-diylbis(3-(3,5-di-tert.-butyl-4-hydroxyphenylpropionamide)) is preferred. Commercial examples of sterically hindered phenolic compounds include Irganox™1098 and Irganox™1010, available from BASF SE of Ludwigshafen, Germany.

Examples of aromatic secondary amine heat stabilizers include 4, 4'-Bis (alpha, alpha-dimethylbenzyl) diphenylamine and 2,4-Bis(n-octylthio)-6-(4'-hydroxy-3,5-di-tbutylanilino)-1,3,5-triazine. Examples of phosphorus-based antioxidants include tris(2,4-di-t-butylphenyl) phosphite; tris (nonylphenyl) phosphite; and diphenyl mono(tridecyl) phosphite. Ultranox™ 626 is a commercial example of a phosphorus-based antioxidant available from Addivant of Danbury, CT.

Copper-based heat stabilizers used in the polyamide composition described herein comprises at least one copper compound and preferably at least one alkali metal halide. The copper is present in the form of copper salts wherein the copper is selected from the group consisting of Cu(I), Cu(II), or a mixture thereof. Cu(I) salts are preferred. Examples of copper heat stabilizers useful in the polyamide compositions include copper salts selected from the group consisting of copper iodide, copper bromide, copper chloride, copper fluoride; copper thiocyanate, copper nitrate, copper acetate, copper naphthenate, copper caprate, copper laurate, copper stearate, copper acetylacetonate, and copper oxide. Preferred copper heat stabilizers include copper halides selected from copper iodide, copper bromide, copper chloride, and copper fluoride. A preferred copper species is copper iodide, and preferably copper (I) iodide. It is preferred that the copper heat stabilizer also include a metal halide selected from the group consisting of LiI, NaI, KI, $MgI_2$, KBr, and $CaI_2$ with KI or KBr being preferred.

Preferably, the copper-based heat stabilizer is a mixture of 5 to 50 weight percent copper salt, 50 to 95 weight percent of metal halide, and from 0 to 15 weight percent of a fatty acid salt, based on the total weight of the copper-based heat stabilizer. Even more preferably, the copper heat stabilizer is a mixture of 10 to 30 weight percent copper salt, 70 to 90 weight percent metal halide, and from 0 to 15 weight percent fatty acid salt, and most preferably the copper heat stabilizer is a mixture of 10 to 20 weight percent copper salt, 75 to 90 weight percent metal halide, and from 0 to 12 weight percent fatty acid salt, based on the total weight of the copper-based heat stabilizer. A preferred heat stabilizer is a mixture of copper iodide and potassium iodide (CuI/KI). The copper stabilizer useful in polyamide compositions described herein may also be blended or mixed with a fatty acid metal salt carrier material. An example of a fatty acid salt carrier material is aluminum distearate. An example of a suitable copper heat stabilizer is Polyadd P201, available from Ciba Specialty Chemicals of Basel, Switzerland, comprising a blend of 7:1:1 weight ratio of potassium iodide, cuprous iodide, and aluminum stearate respectively. Suitable stabilizers may include different weight ratios, from 7:1:1 up to 7:1:4 or 7:1:5, of potassium iodide, cuprous iodide, and aluminum stearate or other carrier material.

The one or more antioxidants or heat stabilizers present in the polyamide composition may range from about 0.1 to 3 weight percent, preferably from about 0.1 to 2 weight percent, more preferably from 0.1 to 1 weight percent and most preferably about 0.1 to 0.75 weight percent based on the total weight of all ingredients (a) to (h) in the polyamide composition.

Lubricant (d)

Suitable lubricants for use as the at least one optional lubricant used in these polyamide compositions include external and internal lubricants. External lubricants are preferred. The presence of an external lubricant allows for easier ejectability of molded articles from the mold.

When external lubricant(s) are used, it is preferably applied to pellets that have been prepared from the polyamide compositions. More preferably, the external lubricants are applied while the pellets are warm, for example soon after extrusion.

Examples of suitable lubricants include, without limitation, fatty acids, fatty acid esters, fatty acid amides, fatty acid metal salts, oxidized polyethylene lubricants, polyethylene based waxes, and combinations of two or more suitable lubricants. Preferably, the lubricant(s) are selected from the group consisting of fatty acid amides, fatty acid metal salts, partly saponified ester waxes of C12 to C30 carboxylic acids, polyolefin waxes, and oxidized polyolefin waxes.

Suitable fatty acids for preparing fatty acid based lubricants comprise 10 to 30 carbon atoms, preferably 12 to 30, more preferably 18 to 30 carbon atoms. The fatty acid may comprise linear or branched carbon chains. The fatty acids may be aliphatic, unsaturated, or partially unsaturated.

Examples of suitable fatty acids include, for example, lauric acid, myristic acid, myristoleic acid, palmitic acid, palmitoleic acid, stearic acid, 12-hydroly stearic acid, oleic acid, elaidic acid, vaccenic acid, arachidic acid, gadoleic acid, eicosenoic acid, behenic acid, erucic acid, lignoceric acid, nervonic acid, lignoceric acid and montanic acid.

Preferably, the fatty acid used to prepare fatty acid amide lubricants comprises 12 to 30 carbon atoms in a linear, aliphatic carbon chain. Examples of preferred fatty acid amides include fatty acid monoamides, such as for example methylstearylamide, ethylstearylamide, dioctadecylstearylamide, dioctadecylsuccinamide, stearylstearylamide, stearylerucamide, phenylstearylamide, methylolstearylamide, and fatty acid bis amides, such as N,N'-methylene-bis sterarylamide; N,N'-ethylene-bis stearylamide; and N,N'-ethylene-bis(12-hydroxyphenyl) stearylamide.

Suitable fatty acids for preparing fatty acid metal salt lubricants comprise 18 to 30 carbon atoms, preferably 18 to 28, more preferably 22 to 28 carbon atoms. The fatty acid may comprise linear or branched carbon chains. The fatty acids may be aliphatic, unsaturated, or partially unsaturated. Preferably the fatty acid used to prepare fatty acid metal salt lubricants comprise 18 to 28 carbon atoms in a linear, aliphatic carbon chain. Examples of fatty acid metal salts include aluminum stearate, sodium stearate, zinc stearate, calcium stearate, aluminum 12-hydroxystearate, sodium 12-hydroxystearate, zinc 12-hydroxystearate, calcium 12-hydroxystearate, aluminum behenate, sodium behenate, zinc behenate, calcium behenate, aluminum montanate, sodium montanate, zinc montanate, and calcium montanate.

Suitable oxidized polyolefin wax-based lubricants include, for example, polyethylene based waxes which can be prepared from linear polyethylene such as high density polyethylene (HDPE) or branched polyethylenes such as low density polyethylene (LDPE). Such waxes are commercially available and include the Licowax™ brand of products available from Clariant Corp. such as PE 520, PE 190, PE830, PE840, PED 521, PED 522, PED 821, PED 822, PED 136, and PED 191.

Other suitable commercial lubricants include Kemamide™ E-180 lubricant (N-stearylerucamide) available from Chemtura Corp.; Crodamide™ 212 lubricant available from Croda Chemicals; Licowax OP lubricant manufactured by Clariant Corp.; PED 191 lubricant, an oxidized polyethylene wax available from Clariant Corp.; Licomont™ CaV 102 lubricant, a calcium montanate available from Clariant Corp.; HostamontTMNAV 101 lubricant, a sodium montanate manufactured by Clariant Corp.; and Loxiol™ VPG 861 lubricant, a pentaerythritol tetrastearate, manufactured by Cognis, Dusseldorf, Germany; Vestowax AO1535 lubricant, available from Evonik Industries, Germany; Acrawax™ C lubricant available from Lonza Chemical Co.; and combinations of these.

Preferably, the at least one lubricant (d) used in the polyamide compositions is selected from the group consisting of oxidized polyethylene waxes, N-stearylerucamides, fatty acid esters, fatty acid amides, fatty acid metal salts, and combinations of two or more of these preferred lubricants. Commercial examples of preferred lubricants include Kemamide E-180, Licowax OP, and Licomont™ CAV102.

When present as an external or internal lubricant, lubricant (d) may be present in the polyamide composition in an amount ranging from about 0.01 to 2.0 weight percent, preferably from about 0.05 to 2.0 weight percent, more preferably from 0.1 to 1.0 weight percent based on the total weight of all ingredients (a) to (h) in the polyamide composition.

Nucleant (e)

The optional nucleant, when present in the polyamide composition, may be any conventional nucleating agent. Thus, a nucleating agent may be organic such as a polymer having a melt point higher than that of the thermoplastic composition or it may be an inorganic material such as talc, molybdenum disulfide, boron nitride, or alkali or alkaline earth metal halide such as LiF, CaF2, and ZnCl2.

When present in the polyamide composition, the concentration of nucleant in the polyamide composition preferably ranges from about 0.01 to 2.0 weight percent, more preferably 0.05 to 2.0, and most preferably 0.1 to 1.5 weight percent, based on the total weight of all ingredients (a) to (h) in the polyamide composition.

Impact Modifier (f)

When present, the optional impact modifier includes, without limitation, one or more polymeric impact modifiers in which the polymer comprises an acid, epoxy, or anhydride functional group. Such functional groups are usually incorporated into the impact modifier by grafting small molecules onto an already existing polymer backbone or by directly copolymerizing a monomer containing the desired functional group into the polymer backbone of the impact modifier. As an example of a suitable type of grafted impact modifier, maleic anhydride may be grafted onto a hydrocarbon rubber (such as an ethylene/α-olefin copolymer, an α-olefin being a straight chain olefin with a terminal double bond such as propylene or 1-octene) using free-radical grafting techniques. The resulting grafted polymer has carboxylic anhydride and/or carboxyl groups attached to it.

Functionalized ethylene copolymers are an example of a polymeric impact modifier wherein the functional groups are directly copolymerized into the polymer backbone, for instance, a direct copolymer of ethylene and a (meth)acrylic acid monomer. The ethylene copolymers may also include acrylate monomers, methacrylate monomers, or a mixture of the two, in addition to (meth)acrylic acid monomers. Examples of acrylate and methacrylate monomers include ethyl (meth)acrylate, n-butyl (meth)acrylate, i-butyl (meth) acrylate and cyclohexyl (meth)acrylate. Useful compounds comprising functional groups include (meth)acrylic acid, 2-hydroxyethyl(meth)acrylic acid, glycidyl(meth)acrylate, and 2-isocyanatoethyl (meth)acrylic acid. The prefix "(meth)" as used herein refers to an optional methyl group. For example, "(meth)acrylic acid" refers to acrylic acid, methacrylic acid, or to both acrylic and methacrylic acid. Suitable functionalized ethylene copolymers for use as impact modifiers include without limitation those described in U.S. Pat. No. 4,174,358.

Another suitable type of impact modifier is a polymer comprising carboxylic acid metal salts. Such polymers may be made by grafting a carboxylic acid or carboxylic acid anhydride containing compound to the polymer or by directly copolymerizing acid or acid anhydride-containing comonomers. Subsequently, some or all of the acid or anhydride groups are neutralized. Useful materials of this sort include Surlyn™ ionomers available from Dow Chemical Company, Midland MI 48674 USA, and neutralized maleic anhydride grafted ethylene/α-olefin polymers having metal cations as counterions. Preferred metal cations for these carboxylate salts include Na, Zn, Li, Mg and Mn cations.

Herein the term "ethylene copolymers" includes ethylene dipolymers, i.e., copolymers of ethylene with one comonomer; ethylene terpolymers i.e., copolymers of ethylene with two comonomers; and ethylene multi-polymers, i.e., copolymers having greater than three different repeat units. Ethylene copolymers useful as impact modifiers include those selected from the group consisting of ethylene copolymers of the formula E/X/Y wherein:

E represents the repeat unit derived from ethylene;
X represents repeat units derived from one or more comonomers of the formula wherein $R^1$ is H, CH3 or C2H5, and $R^2$ is an alkyl group having 1 to 8 carbon atoms; or X represents repeat units derived from vinyl acetate alone or in combination with one or more other comonomers X; wherein the amount of X is from 0 to 50 weight % of the E/X/Y copolymer;
Y represents repeat units derived from one or more monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl (meth) acrylate, 2-hydroxyethyl (meth)acrylate, 2-isocyanatoethyl (meth)acrylate and glycidyl vinyl ether; wherein the amount of Y is from 0.5 to 35 weight % of the E/X/Y copolymer, and preferably 0.5 to 20 weight percent of the E/X/Y copolymer, and E is the remainder weight percent and preferably comprises 40-90 weight percent of the E/X/Y copolymer.

Suitable impact modifiers also include co-grafted impact modifiers, which are blends of polyolefins that exhibit at least two glass transition temperatures and that are obtained from polyolefins comprising 1) 55-90 weight percent of a first polyolefin with at least one glass transition temperature>−20° C. and softening temperature >75° C., said first polyolefin selected from the group consisting of ethylene homopolymers, propylene homopolymers, copolymers of ethylene with one or more alpha-olefins having 3-10 carbon atoms and copolymers propylene with one or more alpha-olefins having 2-10 carbon atoms; and 2) 10-45 weight percent of a second polyolefin with highest glass transition temperature <−20° C. and softening temperature <75° C., said second polyolefin selected from copolymers of ethylene with one or more alpha olefins or dienes having at least 3 carbon atoms wherein the first and second polyolefins are melt blended and co-grafted with a reactive monomer, optionally in presence of a peroxide. The weight percentages are based on the total weight of the first and second polyolefins, and they are complementary, that is, the sum of the weight percentages of the first and second polyolefins is 100 wt %. Suitable co-grafted impact modifiers are described in PCT Intl. Patent Appln. Publn. No. WO2016/053965 A1.

When present in the polyamide composition, the concentration of impact modifiers preferably ranges from about 0.02 to 10 weight percent, more preferably 0.05 to 5, and still more preferably 0.1 to 3 weight percent, based on the total weight of all ingredients (a) to (h) in the polyamide composition.

Amorphous Copolyamide (g)

Optionally, at least one amorphous copolyamide may be used in the polyamide compositions. An example of an amorphous copolyamide is PA 6I/6T comprising from about 60/40 to 80/20 molar ratio of repeat units.

When present in the polyamide compositions disclosed herein, the amorphous copolyamide(s) may range from about 0.1 to 8 weight percent, preferably from about 1 to 4 or 5 percent, based on the total weight of all ingredients (a) to (h) in the polyamide composition.

Optional Additional Additives (h)

The polyamide compositions may optionally comprise one or more additional additives such as for example ultraviolet stabilizers, also known as UV absorbers; processing aids; release agents; flame retardants; flame retardant synergists; colorants, including dyes and pigments such as carbon black and titanium dioxide; hydrolytic stabilizers; anti-static agents; and antiblock agents. The amount of each additive is individually selected, depending upon the desired properties of the polyamide composition. In general, when the optional additional additive(s) are present, their total amount is from 0.01 to 30 wt %, or from 0.01 to 25 wt %, or from 0.01 to 20 wt %, or from 0.01 to 10 wt %, preferably from 0.1 to 5 wt %, based on the total weight of the polyamide composition.

Carbon black is a preferred optional additional additive. When present, its amount is preferably from 0.01 to 5.0 wt %, 0.1 to 2.0 wt %, 0.1 to 1 wt %, or 0.1 to 0.5 wt %, 0.1 to 0.3 wt %, or about 0.1 wt %, based on the total weight of the polyamide composition.

Suitable flame retardants and flame retardant synergists are described in U.S. Pat. No. 7,989,538, issued to Yuji Saga, and U.S. Pat. No. 8,541,489, issued to Yige Yin. Phosphorus-based flame retardants are preferred, and more preferred flame retardants include, without limitation, aluminum diethylphosphinate, aluminum methylethylphosphinate, zinc diethylphosphinate, zinc methylethylphosphinate, aluminum isopropylisobutylphosphinate, aluminum isopropyltertbutylphosphinate, and aluminum diisobutylphosphinate. When the optional additional additive(s) include one or more flame retardants or synergists, the total amount of the flame retardant(s) and synergist(s) is preferably from 5 to 20 wt % or 25 wt %, based on the total weight of the polyamide composition.

Preparation of Polyamide Compositions

The polyamide compositions may be prepared by any melt-blending method in which all ingredients are adequately mixed. Preferably, all polymeric ingredients are adequately mixed and all non-polymeric ingredients are adequately dispersed in the polyamide resin matrix. Any suitable melt-blending method may be used for mixing the polymeric ingredients and non-polymeric ingredients of the present polyamide composition. For example, polymeric ingredients and non-polymeric ingredients may be fed into a melt mixer, such as single screw extruder or twin-screw extruder, agitator, single screw or twin-screw kneader, or Banbury mixer, and the addition step may include the addition of all ingredients at once or gradual addition of one or more ingredients, or one or more portions of the one or more ingredients, in batches. When the polymeric ingredients and non-polymeric ingredients are gradually added in batches, a part of the polymeric ingredients or non-polymeric ingredients is first added, and then is melt-mixed with the remaining polymeric ingredients and non-polymeric ingredients that are subsequently added, until an adequately mixed composition is obtained.

Polyamide Compositions

Copolyamides comprising 6T/6I/6 repeat units as described herein, when blended or mixed with a reinforcing agent, heat stabilizer, and optionally other ingredients, form copolyamide compositions that exhibit a specific combination of one or more physical properties including strain recovery, mold shrinkage, surface gloss, and glass transition temperatures (Tg). These physical properties depend on the molar concentration of 6T, 6I, and 6 repeat units in the semiaromatic copolyamide.

Accordingly, the polyamide compositions described herein, when molded into articles or test samples, comprise a combination of one or more properties including a Tg of at least 100° C., a strain recovery of at least 85 percent measured at 150° C., and a mold shrinkage of 0.8 percent or less when measured as an average of the flow and transverse direction. Preferably, the polyamide compositions are characterized by all three of these physical properties.

Also preferably, polyamide compositions exhibit one or more of: a strain recovery of at least 85 percent, preferably at least 88 percent, and more preferably at least 90 percent when measured by DMA at 150° C.; a mold shrinkage of 0.8 percent or less, or 0.7 percent or less, or 0.6 percent or less, when measured according to ISO 294-4; a Tg of at least 100° C., preferably at least 110° C., and more preferably at least 120° C., as measured according to ASTM-E1356-08(2014); and an inherent viscosity of at least 0.80, preferably at least 0.90, as measured according to the method set forth in the Examples, below.

The physical properties of the polyamide compositions are balanced such that articles comprising at least one annular connector and having a desirable undercut can be molded and removed from the mold without damage that renders the articles unusable.

Articles

The polyamide compositions described herein are suitable for forming a variety of articles by molding, such as for example injection molding or compression molding. Some preferred articles are annular self-stripping articles, which include profiles with non-uniform widths, such that when the article is removed from the mold it is compressed, as by pulling a wider portion of the article through a narrower portion of the mold. Annular connectors, for example, have a non-uniform profile, and their wider portions are radially compressed as they are removed through the narrower portions of the molds in which they are formed. Articles that comprise annular connectors include water pump housings, thermostat housings, and water inlets and outlets for parts such as automotive radiators and engine blocks.

After the wider portion of the article is pulled through the narrower portion of the mold, the wider portion of article desirably regains its larger dimension, or regains at least a portion of its larger dimension, and does not retain the dimension of the narrower portion of the mold. Also preferably, the article is not otherwise permanently marred by the compression of its wider portion, for example by breaking, cracking, warping, buckling, or bulging. These favorable results may be obtained by molding the preferred articles from the polyamide compositions described herein.

Figure 1:
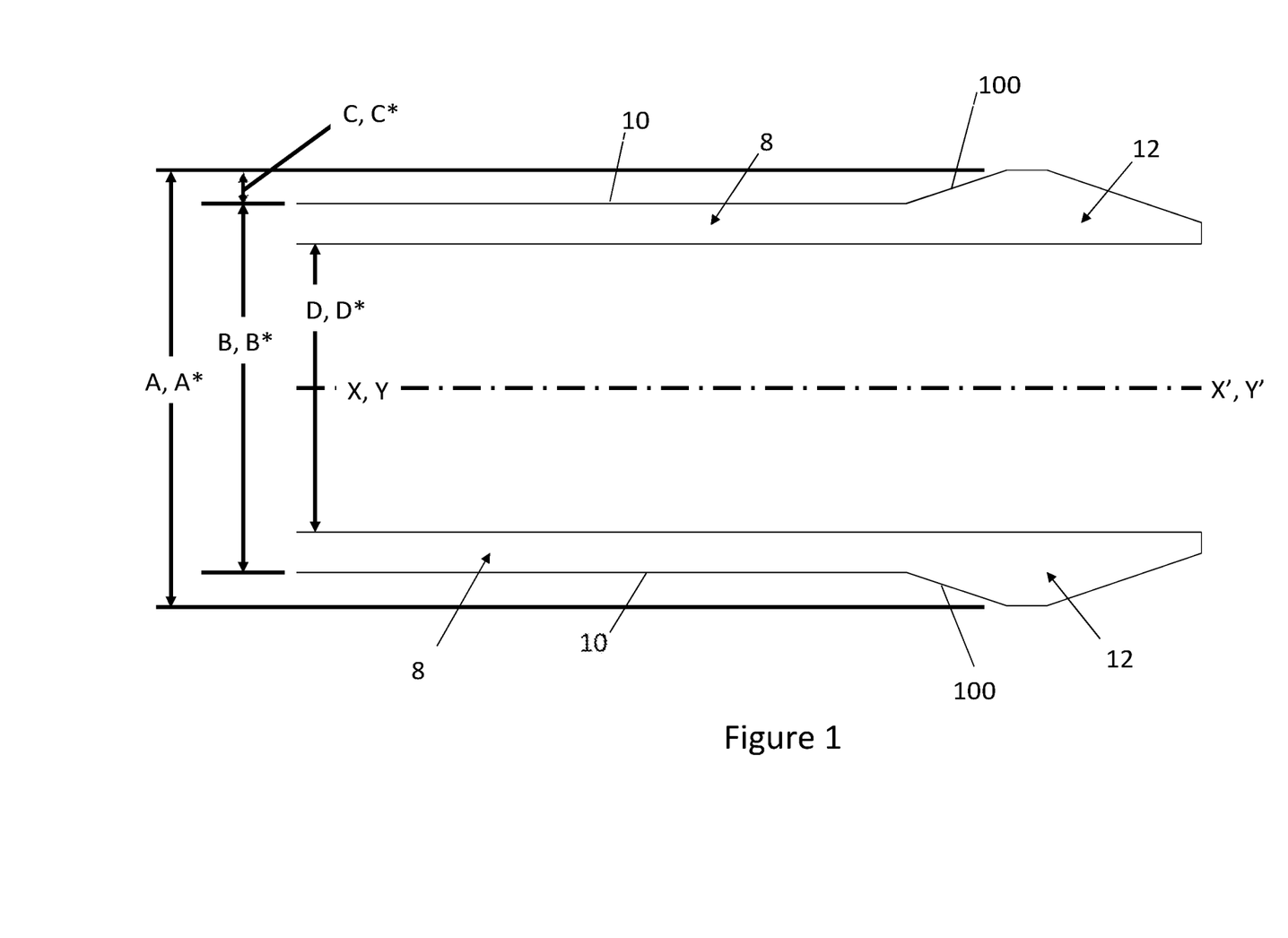
FIG. 1 is a cross-sectional view of a molded annular connector, before removal from the mold, showing a barb and shaft.

Referring now to the drawings, wherein like reference numerals designate corresponding structure throughout the views, and referring in particular to FIG. 1, an annular connector 10 is depicted in its mold 100. The annular connector comprises a shaft 8 and a barb 12. The barb 12 is characterized by a maximum diameter that is larger than the maximum diameter of the shaft 8. Still referring to FIG. 1, the maximum diameter A* of the barb 12 of the annular connector 8 is equal to the maximum diameter A of the mold 100. The diameter B* of the shaft 8 is equal to the diameter B of the shaft portion of the mold 100. The difference 2·C* between the diameter B* of the shaft 8 and the maximum diameter A* of the barb 12 is equal to the difference 2·C between the diameter B of the shaft portion and the maximum diameter A of the barb portion of the mold 100. Finally, the inner diameter D* of the annular connector 10 is equal to the outer diameter D of a pin portion of the mold 100. This pin portion, which preserves an opening within the annular connector 10 so that fluids may pass through the article and which is withdrawn from the annular connector 10 before it is unmolded, is not shown in the Figures.

In FIG. 1, the annular connector 10 fills the mold 100. Therefore, the surface of the annular connector 10 is adjacent to the surface of the mold 100. Moreover, A and A*, B and B*, C and C* are equal, because the material is molten. Shrinkage due to solidification and thermal effects and deformation from ejection have not yet occurred. Finally, the line X,X', which is the longitudinal axis of the annular connector 10, is coincident with the line Y,Y', which is the longitudinal axis of the mold 100.

Figure 2:
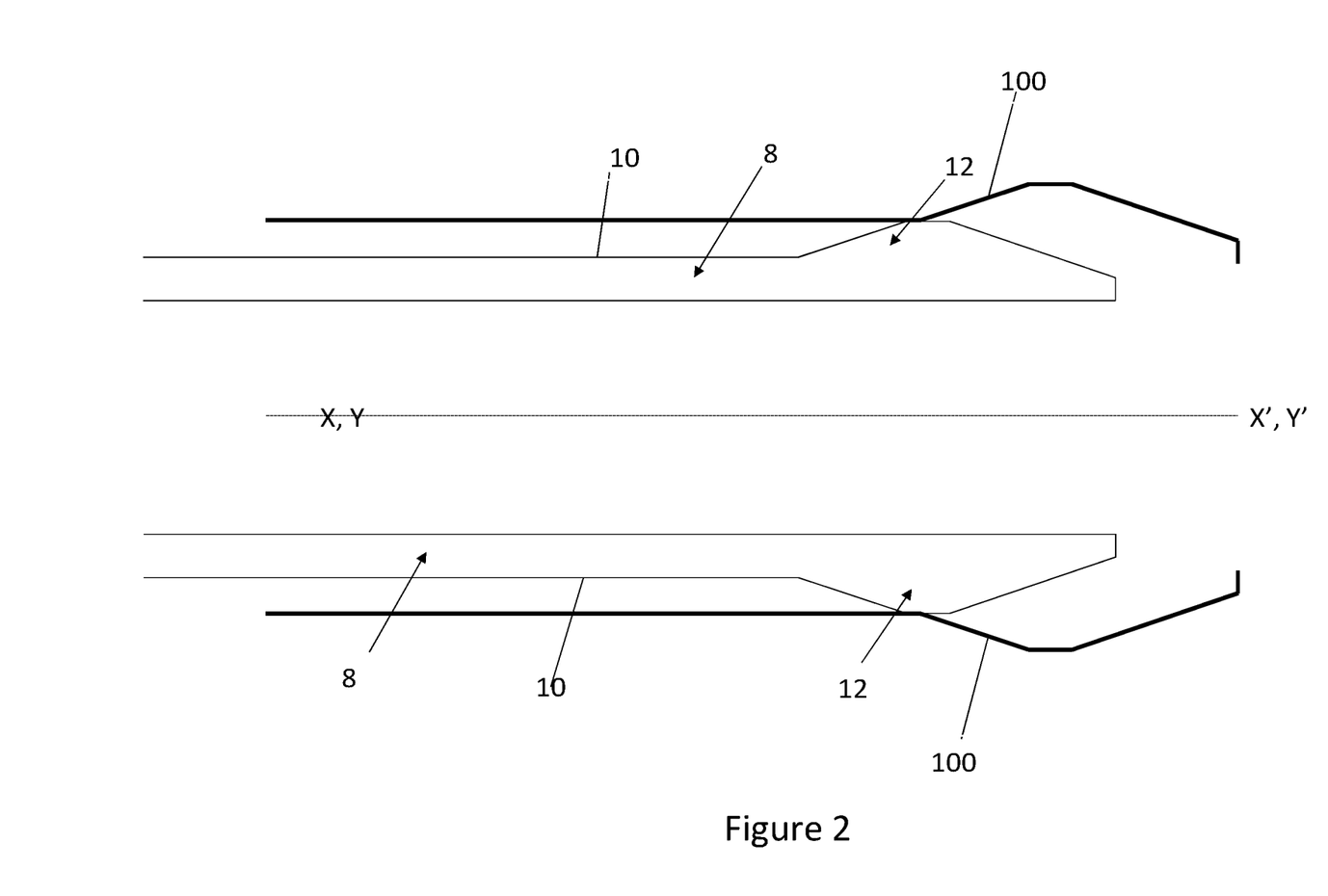
FIG. 2 is a cross-sectional view of an annular connector showing the barb at maximum deflection while the annular connector is being removed from the mold.

Referring now to FIG. 2, the annular connector 10 is displaced longitudinally along the axis Y,Y' but not entirely removed from the mold 100. The annular connector 10 is compressed so that its maximum barb diameter A* is equal to the diameter B of the shaft portion of the mold 100. In fact, annular connector 10 is depicted at the point of maximum strain on the shaft 8 and the barb 12. The height of the barb 12 from the shaft 8 on the annular connector 10 (the undercut C*) directly affects the strain on the molded article during removal from the mold 100.

Still referring to FIG. 2, the annular connector 10 may exhibit a variety of deformations that are not depicted, for example the diameter B* of the shaft 8 may vary from the diameter B of the shaft portion of the mold 100, at the point on the shaft 8 most distant from the barb 12, to a diameter that is the difference of diameter B minus 2·C*, at the point on the shaft 8 that is closest to the barb 12. The inner diameter D* of the annular connector 10 may not be uniform, if the annular connector 10 loses its cylindrical shape during the unmolding process, for example by buckling. These deformations may be temporary or permanent.

Upon release from the mold 100 (not illustrated), the maximum barb diameter A* preferably increases so that it is greater than diameter B of the shaft portion of the mold 100 or, more preferably, A* approaches equality with or is equal to the maximum diameter A of the barb portion of the mold 100, or the difference 2·C* approaches equality with or is equal to the difference 2·C of the mold 100, or both A* and 2·C* approach equality with or are equal to A and 2·C. This close correspondence between the molded and unmolded shapes is at least in part a function of the favorable physical properties of the polyamide composition, such as, for example, strain recovery and mold shrinkage.

As noted above, annular connectors are examples of preferred articles. Self-stripping annular connectors or snap joints are commonly used to connect two different parts together such as a hose to the housing of a water pump. Annular connectors comprise a protrusion or barb which has a larger diameter than the shaft or land of the annular connector. Referring again to FIG. 1, height C is also called the undercut of the annular connector 10. The undercut C plays an important role in the performance of the annular connector 10. First, typically the greater the undercut C, the better or tighter the connection between the annular connector 10 and the part to which it is to be connected. A larger undercut C, however, requires a greater strain from the material and generally greater force to eject the self-stripping annular connectors from the mold. In addition, if the undercut C is too great, excessive deformation of the annular connector 10 during ejection from the mold may cause breakage, cracks, or permanent deformation of the molded article, especially around or inside the barb 12 of the annular connector 10. Thus, the largest operative size of the undercut C is determined by several factors including the maximum strain the molded part can undergo without breakage, cracks, or permanent deformation. The maximum strain is determined by the components used in the polyamide composition used to prepare the article.

Referring again to FIG. 1, the polyamide compositions described herein allow for the molding of articles having annular connectors 10 in which the diameter A* of the barb 12 is at least 0.5%, at least 0.8%, at least 0.9%, at least 1.0%, at least 1.1%, at least 1.2%, at least 1.3%, at least 1.5%, at least 1.7%, at least 2.0%, at least 2.3%, or at least 2.6%, or at least 2.8% greater than what is achieved with otherwise identical polyamide compositions, processed identically in identical molds, in which the only difference is that one or more different polyamides or copolyamides are substituted for the PA 6T/6I/6 copolyamides described herein. Preferably, the height A* of the barb 12 is at least at least 2.6% greater, preferably 2.8% greater, at 140° C. and 1.3% greater, preferably 1.5% greater, at 150° C., than what is achieved with similar polyamide compositions, processed identically in identical molds, in which one or more different polyamides or copolyamides are substituted for the PA 6T/6I/6 copolyamides described herein.

Still referring to FIG. 1, the polyamide compositions described herein allow for the molding of articles having an annular connector 10 in which the barb diameter A* is at least 1 percent greater, preferably at least 1.2 percent, and most preferably at least 1.3 percent greater than the barb diameter A* of an otherwise identical annular connector 10 molded from an otherwise identical polyamide composition, processed identically in an identical mold, in which the only difference is that one or more different polyamides or copolyamides are substituted for the PA 6T/6I/6 copolyamides described herein. Stated alternatively, in the otherwise identical polyamide composition, all components and amounts are identical to those in the polyamide composition, except that the otherwise identical polyamide composition comprises a second semiaromatic copolyamide in place of the PA 6T/6I/6 copolyamide that is described herein. The second semiaromatic copolyamide is different from the PA 6T/6I/6 copolyamide that is used in the polyamide compositions described and claimed herein. When all compositional changes intended to create larger bulb dimension are held constant, bulb dimension obtained using the claimed semiaromatic copolyamide composition including PA 6T/6I/6 copolyamide that is described herein is substantially larger than the bulb dimension obtained using the second polyamide composition.

When referring in the two paragraphs above to a "similar polyamide composition" or to an "otherwise identical polyamide composition" that comprises a different polyamide or copolyamide in place of the PA 6T/6I/6 copolyamide that is described herein, the different polyamide or copolyamide preferably comprises a second semiaromatic copolyamide. More preferably, the second aromatic copolyamide comprises repeat units selected from any two, but not all three of, 6T, 6I and 6. Still more preferably, the second semiaromatic copolyamide comprises one or more of PA-2 through PA-7, as described in the Examples, below.

In this connection, barb diameters A* of annular connectors 10 used in automotive applications typically range from about 8 to 10 mm, and a difference of 0.1 mm (about 1 percent) is considered significant.

Still referring to FIG. 1, when molded at 150° C., the polyamide compositions described herein allow for the molding of articles having an annular connector 10 in which the barb diameter A* is at least 93%, at least 94%, at least 95%, or at least 96% of the tooled barb diameter A of the mold 100. For example, if the mold 100 has dimensions to mold a barb diameter of 9.6 mm, and the article molded using this mold at 150° C., after being allowed to cool to room temperature, has a barb diameter of 9.1 mm, then the molded article has a barb diameter A* which is about 95% that of the tooled diameter A of the mold 100. In contrast, an otherwise identical annular connector 10 molded from an otherwise identical polyamide composition, processed identically in an identical mold, in which the only difference is that one or more different polyamides or copolyamides are substituted for the PA 6T/6I/6 copolyamides described herein, may have a barb diameter A* that is about 92% or less of the tooled diameter A of the mold 100.

Finally, defects that may result from the compression and release of the article during its unmolding include breakage or cracking on the inside or outside surfaces of the annular connector. Preferably, molded articles comprising at least one annular connector prepared from these polyamide compositions are capable of being removed or ejected from the mold without substantial breakage or cracking that render the article unfit for its intended purpose. More preferably, the unmolded article exhibits only minor breakage or cracking that are mere cosmetic flaws. Still more preferably, the unmolded article exhibits no visible breakage or cracking. Stated alternatively, upon visual inspection of the unmolded article by the unaided human eye no surface breaks or cracks are detected.

The following examples are provided to describe the invention in further detail. These examples, which set forth a preferred mode presently contemplated for carrying out the invention, are intended to illustrate and not to limit the invention.

EXAMPLES

Working examples are identified by "E" in the tables below, and comparative examples are identified by "C".

Materials

PA-1A: 6T/6I/6 polyamide copolymer having a molar ratio of 57/25/18 and an IV of 0.87.

PA-1B: 6T/6I/6 polyamide copolymer having a molar ratio of 59/23/18 and an IV of 0.87.

PA-1C: 6T/6I/6 polyamide copolymer having a molar ratio of 54.5/27.3/18.2 and an IV of 1.13.

PA-1D: 6T/6I/6 polyamide copolymer having a molar ratio of 57/25/18 and an IV of 1.05.

PA-1E: 6T/6I/6 polyamide copolymer having a molar ratio of 58/24/18 and an IV of 1.10.

PA-1F: 6T/6I/6 polyamide copolymer having a molar ratio of 59/23/18 and an IV of 1.11.

PA-1G: 6T/6I/6 polyamide copolymer having a molar ratio of 59/23/18 and an IV of 1.04.

PA-1H: 6T/6I/6 polyamide copolymer having a molar ratio of 58/24/18 and an IV of 0.87

PA-1I: 6T/6I/6 polyamide copolymer having a molar ratio of 50/25/25 and an IV of 0.92

PA-1J: 6T/6I/6 polyamide copolymer having a molar ratio of 50/20/30 and an IV of 0.90

PA-1K: 6T/6I/6 polyamide copolymer having a molar ratio of 50/30/20 and an IV of 0.91

PA-2—A 6T/DT polyamide copolymer having a molar ratio of 50/50 and an IV of 0.90.

PA-3—A 6T/DT polyamide copolymer having a molar ratio of 50/50 and an IV of 1.02.

PA-4—A 6T/66 polyamide copolymer having a molar ratio of 55/45 and an IV of 0.94.

PA-5—A 6I/6T polyamide copolymer having a molar ratio of 70/30 and an IV of 0.75.

PA-6: A 6I/6T polyamide copolymer having a molar ratio of 70/30 and having an IV of 0.81.

PA-7: a 6T/6I polyamide copolymer having a molar ratio of 60/40 and an IV of 0.92.

TS—a thermal stabilizer comprising a blend of 7-1-1 (by weight) of potassium iodide, cuprous iodide, and aluminum stearate, available from Ciba Specialty Chemicals.

Lubricant A—an oxidized polyethylene wax available as PED 191 from Clariant Corp., Charlotte, N.C.

Lubricant B—a partly saponified ester wax of montanic acids available as Licowax® OP available from Clariant Plastics & Coatings, USA Colorant—a carbon black masterbatch IM-A—a modified ethylene acrylic copolymer available as Fusabond® A560 from Dow Chemical Company, Midland Mich.

IM-B—An ethylene α-olefin copolymer grafted with maleic anhydride available as TRX 301E from E.I. du Pont de Nemours and Company, Inc., Wilmington, DE Talc—Talcron® MP10-52 having an average particle size of 1 micron available from The Cary Company, Addison, IL, USA.

GF—a chopped E-glass fiber reinforcing agent having an average length of 3 mm and available as T-262H from Nippon Electric Glass Co., Ltd., Japan.

Test Methods

Tensile Strength was measured according to ISO 527 (2012)

Tensile modulus was measured according to ISO 527 (2012)

Elongation at break was measured according to ISO 527 (2012)

Glass transition temperature (Tg) was measured by DSC according to ASTM E1356-08(2014)

Mold Shrinkage was measured according to ISO 294-4 (2018)

Intrinsic viscosity (IV) was measured on a 0.5 wt % solution of polyamide in m-cresol at 25° C. according to ISO 307 (2007)

Surface Gloss (%) was measured according to ASTM D523 with 60 degree angle.

LLC (long life coolant) immersion test was conducted at 140° C. up to 750 hours. Standard ISO tensile bars, (30 bars/Parr bomb) are immersed in 50/50 blend of Toyota genuine super long-life coolant and de-ionized water in pressure proof Parr bomb.

Strain Recovery (%)

Strain recovery was measured using a TA Instruments Q800 DMA (Dynamic Mechanical Analyzer). Test samples having dimensions of 50 mm×12.8 mm×1.6 mm (L×W×H) were used. To these test samples were applied 1% strain at 3 point bending mode for 15 minutes at 150° C. at which point the strain was removed and the strain recovery for 30 minutes was recorded.

MV (Melt Viscosity)

MV was measured using Dynisco Capillary Rheometer LC7000, at 325° C. after held for 300 seconds to melt a resin in the Dynisco Capillary Rheometer barrel. MV was reported at shear rate 1000 sec−1. The die length was 20.32 mm, the die diameter was 1.016 mm, and the entrance angle was 120° (ASTM compliant). Before the measurement, the resin was dried at 100° C. under vacuum for minimum of 12 hours.

Barb Diameter (A*)

A molded part was extracted from the mold and allowed to return to room temperature. Barb diameter A* was measured using calipers at several rotational angles around the part and the maximum A* is identified and recorded.

TABLE 1

|  | E1 | C1 | C2 | E2 | E3 |
|---|---|---|---|---|---|
| PA-1A | 98.7 |  |  | 95.7 | 97.2 |
| PA-2 |  | 98.7 |  |  |  |
| PA-3 |  |  | 98.7 |  |  |
| PA-5 |  |  |  | 3 |  |
| IM-B |  |  |  |  | 1.5 |
| Talc | 1.0 | 1.0 | 1.0 | 1.0 | 1.0 |
| Lubricant B | 0.3 | 0.3 | 0.3 | 0.3 | 0.3 |
| Physical Properties | | | | | |
| Strain Recovery (%) | 92 | 83 | 83 | 92 | 91 |
| Mold Shrinkage (%) | 1.33 | 1.3 | 1.23 | 1.28 | 1.37 |
| Tg (° C.) | 120 | 135 | 135 | 120 | 120 |

Table 1 shows the physical properties of copolyamides which are used in the preparation of polyamide compositions. C1 and C2 use PA 6T/DT (IV 0.90) and PA 6T/DT (IV 1.02) respectively and fail to exhibit the desired combination of physical properties. E2 and E3 use PA 6T/6I/6 having specific molar ratios of repeat units with E2 additionally comprising 3 weight percent of amorphous PA 6I/6T and E3 comprising 1.5 percent of an impact modifier. E1 to E3 all exhibit the desired combination of physical properties compared to C1 and C2.

TABLE 2

|  | E4 | E5 | C3 | C4 | E6 | E6A |
|---|---|---|---|---|---|---|
| PA-1A | 95.7 | 94.2 |  |  |  |  |
| PA-4 |  |  | 98.7 |  |  |  |
| PA-7 |  | 3 |  | 98.7 |  |  |
| PA-1E |  |  |  |  | 98.7 |  |
| PA-1C |  |  |  |  |  | 98.9 |
| TS |  |  |  |  |  | 0.4 |
| IM-B | 3 | 1.5 |  |  |  |  |
| Talc | 1.0 | 1.0 | 1.0 | 1.0 | 1.0 | 0.5 |
| Lubricant B | 0.3 | 0.3 | 0.3 | 0.3 | 0.3 | 0.2 |
| Physical Properties | | | | | | |
| Strain Recovery (%) | 91 | 91 | 98 | 84 | 93 | 96 |
| Mold Shrinkage (%) | 1.43 | 1.41 | 1.75 | 1.17 | 1.29 | 1.29 |
| Tg (° C.) | 120 | 120 | 85 | 125 | 120 | 120 |

Table 2 shows the physical properties of copolyamides which are used in the preparation of polyamide compositions. C3 and C4 use PA 6T/66 and PA 6I/6T respectively as copolyamide resins and fail to exhibit the desired combination of physical properties. E4, E5, E6 and E6A use PA 6T/6I/6 having specific molar ratios of repeat units as the copolyamide resin and all exhibit the desired combination of physical properties compared to C3 and C4 which use different polyamide resins.

TABLE 3

|  | E7 | E8 | E8A | E9* |
|---|---|---|---|---|
| PA 1B | 58.8 |  |  | 58.8 |
| PA 1F |  | 58.8 |  |  |
| PA1G |  |  | 60.34 |  |
| PA-6 | 3.5 | 3.5 | 3.16 | 3.5 |
| HS | 0.4 | 0.4 | 0.4 | 0.4 |
| Lubricant A | 0.3 | 0.3 | 0.3 | 0.3 |
| Colorant | 0.8 | 0.8 | 0.8 | 0.8 |
| IM-A | 1.2 | 1.2 | 1.2 |  |
| GF | 35 | 35 | 35 | 35 |
| Physical Properties | | | | |
| Tensile Strength (MPa) | 232 | 233 | 239 | 243 |
| Elongation at Break (%) | 2.24 | 2.21 | 2.11 | 2.26 |
| Tensile Modulus (MPa) | 13210 | 13199 | 13963 | 13291 |
| MV 325° C. 1000 (1/s) Pa-s | 184 | 231 | 267 | 277 |
| Barb Diameter[1] (mm) | 9.09 | 9.09 | 9.08 | 9.12 |
| Barb Diameter[2] (mm) | 9.02 | 9.02 | 9.05 | 9.07 |

Tooled 9.6 mm mold barb diameter for all examples
[1] 140 C. Mold Temperature
[2] 150 C. Mold Temperature
*E9 is made by SPP of E7 sample Table 3 shows examples (E7, E8, E8A and E9) of polyamide compositions comprising PA 6T/6I/6 copolyamides which have been molded into articles comprising an annular connector using a mold with a tooled barb diameter of 9.6 mm. The resulting barb diameters on all the examples is at least 9.02 mm.

TABLE 4

|  | E10 | E11 | C5 | C6 |
|---|---|---|---|---|
| PA-1E | 60.15 | | | |
| PA-1D | | 60.15 | | |
| PA-3 | | | 60.54 | |
| PA-2 | | | | 63.1 |
| PA-5 | 2 | 2 | 3.16 | |
| HS | 0.4 | 0.4 | 0.4 | 0.4 |
| Talc | 0.5 | 0.5 | | 0.5 |
| Colorant | 0.8 | 0.8 | 0.8 | 0.8 |
| IM-B | 1 | 1 | | |
| GF | 35 | 35 | 35 | 35 |
| Lubricant B[1] | 0.15 | 0.15 | 0.1 | 0.2 |
| Physical Properties | | | | |
| Tensile Strength (MPa) | 220 | 236 | 220 | 225 |
| Elongation at Break, (%) | 2.3 | 2.6 | 2.2 | 2.25 |
| Tensile Modulus (MPa) | 13000 | 13000 | 13397 | 12978 |
| MV 325° C. 1000 (1/s) Pa-s | 298 | 279 | 213 | 169 |
| Barb Diameter[2] (mm) | 8.77 | 8.79 | 8.54 | 8.45 |
| Barb Diameter[3] (mm) | 8.71 | 8.72 | 8.58 | 8.50 |
| Mold Shrinkage (%) | 0.42 | 0.39 | 0.50 | 0.58 |

Tooled 9.3 mm mold barb diameter for all examples
[1]External
[2]140° C. Mold Temperature
[3]150° C. Mold temperature Table 4 shows examples of polyamide compositions comprising PA 6T/6I/6 copolyamides which have been molded into articles comprising an annular connector using a mold with a tooled barb diameter of 9.3 mm. The barb diameter of example E10 (8.71 mm) is at least 0.13 mm greater than C5 when molded at 150° C. and 0.23 mm when molded at 140° C., a 1.5% and 2.7% improvement respectively.

It is known that removing the nucleant (talc) contributes to larger barb diameter and that the inclusion of an amorphous polyamide provides larger barb diameter due to lower crystallinity for the formulation. Without wishing to be held to theory, it is believed that both of these effects are attributable to lower crystallinity in the copolyamide composition. It is further known that the inclusion of an impact modifier has very little effect on the barb diameter. Therefore, it is surprising that E11 shows 1.6% and 2.9% larger barb diameter at 150° C. and 140° C. mold, respectively, compared to the barb diameter of C5.

TABLE 5

|  | C7 | E12 | E13 | E14 | E15 | E16 | E17 | E18 |
|---|---|---|---|---|---|---|---|---|
| PA-1F | | | 63.2 | | 60.04 | | | 59.7 |
| PA-1E | | | | | | | 59.7 | |
| PA-1D | | 63.2 | | 60.04 | | 59.7 | | |
| PA-3 | 60.54 | | | | | | | |
| PA-5 | 3.16 | | | | | | | |
| PA-6 | | | | 3.16 | 3.16 | 2.5 | 2.5 | 2.5 |
| HS | 0.4 | 0.4 | 0.4 | 0.4 | 0.4 | 0.4 | 0.4 | 0.4 |
| Talc | | 0.5 | 0.5 | 0.5 | 0.5 | 0.5 | 0.5 | 0.5 |
| Colorant | 0.8 | 0.8 | 0.8 | 0.8 | 0.8 | 0.8 | 0.8 | 0.8 |
| IM-B | | | | | | 1.0 | 1.0 | 1.0 |
| GF | 35 | 35 | 35 | 35 | 35 | 35 | 35 | 35 |
| Lubricant B[1] | 0.1 | 0.1 | 0.1 | 0.1 | 0.1 | 0.1 | 0.1 | 0.1 |
| Physical Properties | | | | | | | | |
| Tensile Strength (MPa) | 220 | 225 | 235 | 232 | 223 | 240 | 219 | 239 |
| Elongation at Break (%) | 2.2 | 2.3 | 2.2 | 2.2 | 2.1 | 2.4 | 2.2 | 2.4 |
| Modulus (MPa) | 13397 | 13222 | 13265 | 13262 | 13529 | 13771 | 12878 | 13963 |
| MV 325° C. 1000 (1/s) Pa-s | 213 | 190.3 | 186 | 192 | 196 | 194 | 217 | 206 |
| Barb Diameter[2] (nun) | 8.90 | 9.02 | 9.10 | 9.06 | 9.12 | 9.08 | 9.11 | 9.13 |
| Barb Diameter[3] (mm) | 8.77 | nm | 9.06 | nm | 9.08 | 9.02 | nm | 9.11 |

Tooled 9.6 mm mold barb diameter for all examples
[1]External lubricant
[2]140° C. Mold Temperature
[3]150° C. Mold Temperature
nm—not measured Table 5 shows examples of polyamide compositions comprising PA 6T/6I/6 copolyamides which have been molded into articles comprising an annular connector using a mold with a tooled barb diameter of 9.6 mm. The barb diameter of examples E12 to E15 are at least 0.12 mm greater than C7 when molded at 140° C. and 0.29 mm when molded at 150° C., a 1.3% and 3.2% improvement respectively. E16 to E18 comprise a toughener and exhibit similar barb diameter's to examples E12 to E15.

C7 has the same formulation as C5, but two different molding tools were used. It is known that removing the nucleant (talc) contributes to larger barb diameter and that the inclusion of an amorphous polyamide provides larger barb diameter due to lower crystallinity for the formulation. Without wishing to be held to theory, it is believed that both of these effects are attributable to lower crystallinity in the copolyamide composition. It is further known that the inclusion of an impact modifier has very little effect on the barb diameter. Therefore, it is surprising that E13, which does not contain an amorphous polyamide, has 2.2% and 3.3% larger barb diameter at 150° C. and 140° C. mold, respectively, compared to the barb diameter of C7.

TABLE 6

|  | C8 | E19 | E20 | E21 |
|---|---|---|---|---|
| PA-4 | 63.9 | | | |
| PA-1C | | 63.9 | | |
| PA-1A | | | 60.15 | |
| PA-1D | | | | 60.30 |
| TS | 0.4 | 0.4 | 0.4 | 0.4 |
| IM-B | | | 1.0 | 1.0 |
| PA-5 | | | 2.0 | 2.0 |
| Talc | 0.5 | 0.5 | 0.5 | 0.5 |
| Lubricant B | 0.2 | 0.2 | 0.15 | 0.2 |
| Colorant | | | 0.8 | 0.8 |
| GF | 35 | 35 | 35 | 35 |
| Physical Properties | | | | |
| Elastic Recovery (%) | 91 | 88 | 97 | 89 |
| Mold Shrinkage (%) | 0.67 | 0.48 | 0.59 | 0.59 |
| Tg (° C.) | 85 | 120 | 120 | 120 |

Table 6 shows physical properties of various combinations of materials in the polyamide compositions disclosed herein.

TABLE 7

|  | C9 | E22 | E23 | E24 | E25 | E26 | E27 |
|---|---|---|---|---|---|---|---|
| PA-3 | 59.99 | | | | | | |
| PA-1D | | 60.09 | | 53.25 | | 59.75 | |
| PA-1F | | | 60.09 | | 53.25 | | 59.75 |
| PA-5 | 3.16 | 3.16 | 3.16 | 10.0 | 10.0 | 2.5 | 2.5 |
| TS | 0.4 | 0.4 | 0.4 | 0.4 | 0.4 | 0.4 | 0.4 |
| IM-B | | | | | | 1.00 | 1.00 |
| Talc | 0.35 | 0.35 | 0.35 | 0.35 | 0.35 | 0.35 | 0.35 |
| Lubricant A | 0.3 | | | | | | |
| Colorant | 0.8 | 0.8 | 0.8 | 0.8 | 0.8 | 0.8 | 0.8 |
| GF | 35 | 35 | 35 | 35 | 35 | 35 | 35 |
| Lubricant B[1] | | 0.2 | 0.2 | 0.2 | 0.2 | 0.2 | 0.2 |
| Surface Gloss[2] (%) | 9.0 | 25.6 | 55.0 | 17.4 | 26.0 | 33.5 | 56.8 |
| Surface Gloss[3] (%) | 14.3 | 81.1 | 82.3 | 76.0 | 81.8 | 82.3 | 81.2 |

[1]external lubricant
[2]molded at 140° C.
[3]molded at 150° C.

Table 7 shows surface gloss properties of articles molded from the polyamide compositions and range from 76 to 82.3% when molded at 150° C. compared to 14.3% for C9 which uses a 6T/DT copolyamide in place of a 6T/6I/6 copolyamide.

TABLE 8

|  |  | E28 | E29 | C10 | C11 | C12 | E30 |
|---|---|---|---|---|---|---|---|
| PA 1D | | | | | | | 59.6 |
| PA 1E | | 62.3 | | | | | |
| PA1H | | | 62.3 | | | | |
| PA-1I | | | | 62.3 | | | |
| PA-1J | | | | | 62.3 | | |
| PA-1K | | | | | | 62.3 | |
| PA-6 | | | | | | | 2.5 |
| HS | | 0.4 | 0.4 | 0.4 | 0.4 | 0.4 | 0.4 |
| Talc | | 0.5 | 0.5 | 0.5 | 0.5 | 0.5 | 0.5 |
| Lubricant A | | | | | | | 0.2 |
| Lubricant B[1] | | 0.15 | 0.15 | 0.15 | 0.15 | 0.15 | 0.15 |
| Colorant | | 0.8 | 0.8 | 0.8 | 0.8 | 0.8 | 0.8 |
| IM-B | | 1.0 | 1.0 | 1.0 | 1.0 | 1.0 | 1.0 |
| GF | | 35 | 35 | 35 | 35 | 35 | 35 |
| Physical Properties | | | | | | | |
|  | Tensile Strength (MPa) | 231 | 242 | 234 | 237 | 235 | 228 |
|  | Elongation (%) | 2.26 | 2.23 | 2.24 | 2.24 | 2.29 | 2.21 |
| 250 hrs in LLC | Tensile Strength (MPa) | 116 | 129 | 104 | 104 | 104 | 116 |
|  | Elongation (%) | 2.99 | 3.16 | 3.40 | 3.77 | 3.16 | 3.56 |
|  | Tensile Strength Retention (%) | 50.2 | 53.3 | 44.4 | 43.9 | 44.3 | 50.9 |
|  | Elongation Retention (%) | 132 | 142 | 152 | 168 | 138 | 161 |
| 500 hrs in LLC | Tensile Strength (MPa) | 106 | 114 | 84 | 75 | 93 | 106 |
|  | Elongation (%) | 2.40 | 2.41 | 2.13 | 1.84 | 2.47 | 2.75 |
|  | Tensile Strength Retention (%) | 45.9 | 47.1 | 35.9 | 31.6 | 39.6 | 46.5 |
|  | Elongation Retention (%) | 106 | 108 | 95 | 82 | 108 | 124 |

TABLE 8-continued

|  |  | E28 | E29 | C10 | C11 | C12 | E30 |
|---|---|---|---|---|---|---|---|
| 750 hrs in LLC | Tensile Strength (MPa) | 90 | 95 | 63 | 57 | 79 | 91 |
|  | Elongation (%) | 1.81 | 1.88 | 1.27 | 1.16 | 1.99 | 2.03 |
|  | Tensile Strength Retention (%) | 39.0 | 39.3 | 26.9 | 24.1 | 33.6 | 39.9 |
|  | Elongation Retention (%) | 80 | 84 | 57 | 52 | 87 | 92 |
|  | Barb Diameter$^2$ (mm) | 8.68 | 8.64 | n/a$^3$ | 8.68 | n/a$^3$ | 8.72 |

Tooled 9.3 mm mold barb diameter for all examples
$^1$External
$^2$150° C. Mold Temperature
$^3$could not be molded due to the part breakage at the ejection Table 8 shows LLC immersion test results of molded test bars. C10 uses PA 6T/6I/6 with molar ratio of 50/25/25, C11 uses PA 6T/6I/6 with molar ratio of 50/20/30, and C12 uses PA 6T/6I/6 with molar ratio of 50/30/20. C10 and C11 show much worse LLC resistance at 140° C. than others. C10 and C12 could not be molded into articles comprising an annular connector using a mold with a tooled barb diameter of 9.3 mm. In addition, both of C10 and C12 broke at the ejection of the part.

While certain of the preferred embodiments of the present invention have been described and specifically exemplified above, it is not intended that the invention be limited to such embodiments. Rather, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A polyamide composition comprising:
   (a) 45 to 65 weight percent of a semi-aromatic copolyamide comprising:
      (i) about 54 to about 62 mole percent hexamethylene terephthalamide repeat units;
      (ii) about 12 to about 29 mole percent hexamethylene isophthalamide repeat units; and
      (iii) about 9 to about 26 mole percent caprolactam repeat units;
   wherein the mole percentages are based on the total number of moles of repeat units in the semi-aromatic copolyamide, and wherein the sum of (i), (ii), and (iii) totals 100 mole percent;
   (b) 20 to 50 weight percent of a reinforcing agent;
   (c) 0.1 to 3.0 weight percent of at least one heat stabilizer;
   (d) 0 to 2.0 weight percent of at least one lubricant;
   (e) 0 to 2.0 weight percent of at least one nucleant;
   (f) 0 to 10 weight percent of at least one impact modifier;
   (g) 0 to 8 weight percent of at least one amorphous copolyamide; and
   (h) 0 to 25 weight percent of one or more additional additives,
   wherein said polyamide composition exhibits a Tg of at least 100° C. when measured according to ASTM E1356-08 (2014), and when molded into test samples, exhibits a strain recovery of at least 85 percent measured at 150° C., a mold shrinkage of 0.6 percent or less when measured as an average of the flow and transverse direction according to ISO 294-4, and wherein the weight percentages of (a), (b), (c), (d), (e), (f), (g), and (h) are based on the total weight of the polyamide composition, and where the sum of the weight percentages of (a), (b), (c), (d), (e), (f), (g), and (h) totals 100 weight percent.

2. The polyamide composition of claim 1, wherein said reinforcing agent comprises one or more reinforcing agents selected from the group consisting of glass fibers, flat glass fibers, carbon fibers, and glass flakes.

3. The polyamide composition of claim 1, wherein said heat stabilizer is a copper-based heat stabilizer.

4. The polyamide composition of claim 3, wherein said copper-based heat stabilizer comprises one or more copper salts, said copper salts selected from the group consisting of Cu (I) salts and Cu (II) salts.

5. The polyamide composition of claim 1, wherein said lubricant is an external lubricant.

6. The polyamide composition of claim 1, wherein said impact modifier is present in the polyamide composition.

7. The polyamide composition of claim 6, wherein said impact modifier comprises one or more impact modifiers selected from the group consisting of maleic anhydride grafted ethylene/α-olefin copolymers, ethylene (meth) acrylic acid copolymers, metal neutralized maleic anhydride grafted ethylene/α-olefin polymers, and co-grafted impact modifiers.

8. The polyamide composition of claim 1, wherein the polyamide composition comprises 53.25 to 65 weight percent of the semi-aromatic copolyamide and 0 weight percent of the amorphous copolyamide, and said semi-aromatic copolyamide comprises:
   (i) about 54 to about 62 mole percent hexamethylene terephthalamide repeat units;
   (ii) about 22 to about 29 mole percent hexamethylene isophthalamide repeat units; and
   about 9 to about 18.2 mole percent caprolactam repeat units;
   wherein the mole percentages are based on the total number of moles of repeat units in the semi-aromatic copolyamide, and wherein the sum of the mole percentages of the repeat units (i), (ii), and (iii) totals 100 mole percent.

9. The polyamide composition of claim 1, wherein said amorphous copolyamide is present.

10. The polyamide composition of claim 9, wherein said amorphous copolyamide is a 6I/6T copolyamide having a molar ratio ranging from about 60/40 to 80/20 of 6I to 6T repeat units, based on the total number of moles of repeat units in the amorphous polyamide.

11. An article comprising the polyamide composition of claim 1.

12. The article of claim 11, comprising at least one annular connector.

13. The article of claim 12 that is selected from the group consisting of water inlet or outlet housings, thermostat housings, and water pump housings.

14. The article of claim 12, having a self-stripping barb diameter that is at least 1 percent greater than that of a second article prepared from an otherwise-identical polyamide composition, said second article being formed in an identical mold by a process identical to that by which the article was produced, wherein said otherwise-identical polyamide composition does not comprise the semi-aromatic copolyamide and wherein said otherwise-identical polyamide composition comprises a second polyamide or copolyamide that is different from the semi-aromatic copolyamide.

15. The article of claim 14, which, when viewed with the unaided human eye, does not exhibit visible surface cracks.

16. The article of claim 11, wherein the polyamide composition comprises at least one amorphous polyamide, and which has an average mold shrinkage of 0.7% or less.

17. The article of claim 11, which has a strain recovery of 86% or more.

18. The article of claim 12, having a barb diameter which is at least 93 percent of the tooled barb diameter of the mold used to form the article.

19. The polyamide composition of claim 1, wherein the semi-aromatic copolyamide comprises from about 54 to 59 mole percent hexamethylene terephthalamide repeat units.

20. The polyamide composition of claim 1, wherein the semi-aromatic copolyamide comprises from 18 to about 26 mole percent caprolactam repeat units.

21. The polyamide composition of claim 1, wherein the polyamide composition comprises 45 to 59.7 weight percent of the semi-aromatic copolyamide.

\* \* \* \* \*